Feb. 23, 1937.   C. F. JONES   2,071,408
MICROSCOPE
Filed Jan. 28, 1935
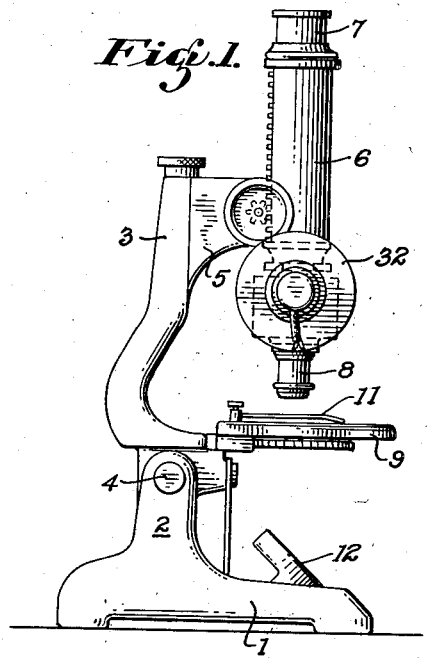
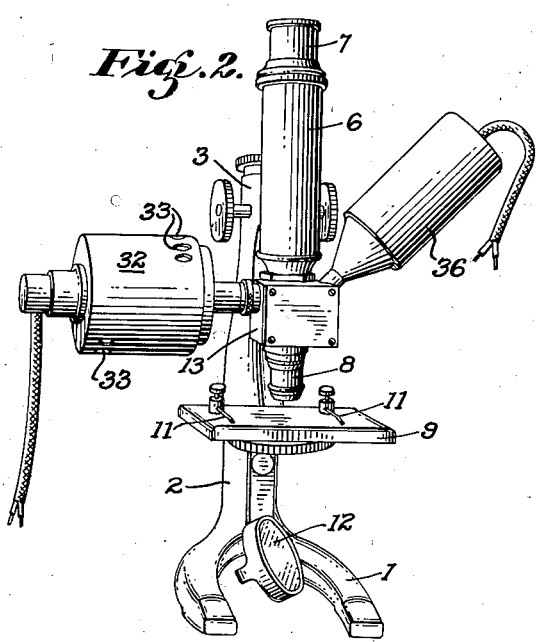
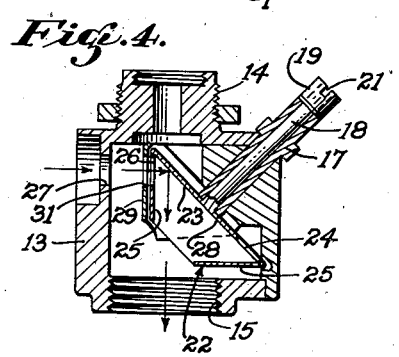
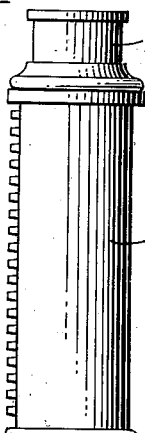
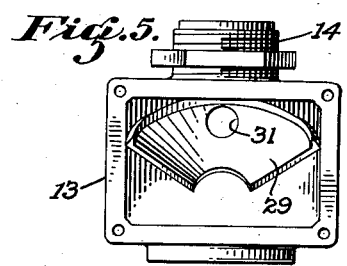
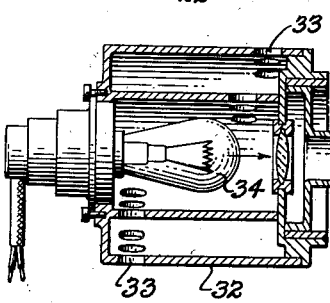
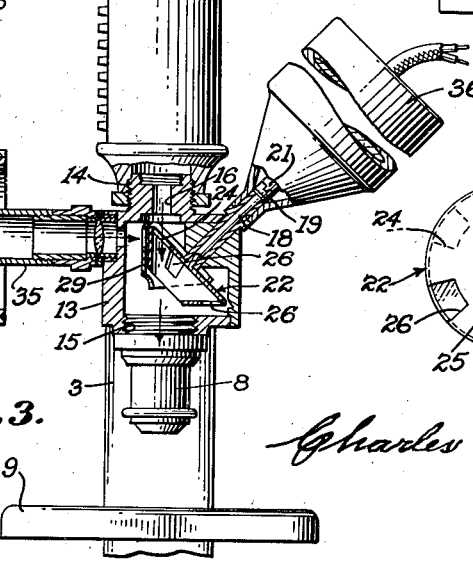
INVENTOR.
Charles F. Jones Patented Feb. 23, 1937

2,071,408

UNITED STATES PATENT OFFICE 2,071,408

MICROSCOPE

Charles F. Jones, San Francisco, Calif.

Application January 28, 1935, Serial No. 3,713

8 Claims. (Cl. 88—39)

This invention relates to a microscope for observing objects by induced light such as phosphorescence.

Ordinarily an object is viewed through a microscope by means of reflected or transmitted light. Certain kinds of matter, however, may be given phosphorescent properties for varying intervals of time by subjecting them to the action of light and it is my desire to take advantage of this property.

In general the object of this invention is the provision of a microscope by which phosphorescent materials or materials in which phosphorescence may be induced may be observed by phosphorescent or induced light rather than by reflected or transmitted light.

More specifically one of the objects of this invention is the provision of an apparatus for observing phosphorescent materials by means of a microscope provided with means for periodically throwing a beam of light along the line of vision to the material and for intermittently observing the light so induced.

Still another object of the invention is the provision of an apparatus for determining whether certain materials may be made temporarily phosphorescent by the action of a beam of light.

The invention possesses other advantageous features, some of which with the foregoing, will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is a side elevation of a microscope in which the objects of my invention have been embodied.

Figure 2 is a front perspective view of the microscope shown in Figure 1.

Figure 3 is a front elevational view, partly in vertical section of the microscope as shown in Figure 2, the section being taken through the axis of the body tube.

Figure 4 is an enlarged sectional detail of the shutter mechanism shown in Figure 3.

Figure 5 is a side elevation of the shutter casing shown in Figure 4 with the side plate and cone removed.

Figure 6 is a front elevation of the rotating frustated cone forming part of the shutter mechanism looking along the axis of the cone.

My invention contemplates the use of a standard microscope comprising a base 1, a pillar 2 and an arm 3 adjustably secured to the pillar by means of an inclination joint 4. Adjustably secured to the upper end of the arm 3 is an adjustment head 5, to the outer end of which is secured a body tube 6, provided at its upper end with an eye piece 7, and at its lower end with an objective 8. A conventional stage 9 is supported by the lower end of the arm 3 and is provided with spring clips 11. Below the stage 9 and carried by the arm 3 is a mirror 12 which may form part of the complete equipment, although of itself it forms no part of my invention.

The lower end of the body 6 terminates in a rectangular casing 13 the upper end of which is provided with a screw fitting 14 adapted to threadedly engage the lower end of the body tube 6, while its lower end is threaded as at 15, in order to accommodate the objective 8. As shown in Figure 3 the fitting 14 is provided with an opening 16 in line with the axis of the body tube which of course is coincident with the line of vision between the eye piece 7 and the objective 8. Mounted in the upper right hand corner of the casing 13 is tubular bearing 17 within which is journaled a shaft 18. The outer end of the shaft terminates in a head 19 provided with a kerf 21, while the lower end of the shaft carries a right angle frustrated cone generally designated as 22. It is to be noted that the shaft 18 is so positioned that the axis of the frustrated cone 22 intersects the axis of the body tube 6 at an angle of 45° and that the base 23 of the cone also intersects the axis of the body tube at an angle of 45°. As best shown in Figure 6 the base 23 of the cone is provided with a number of symmetrically disposed openings or ports 24 along its periphery, which are adapted upon the rotation of the cone to periodically register with the axis of the body tube 6. Since the end of the frustrated cone 22 opposite the base 23 is open, it will be seen that the line of vision through the body tube 6 is unobstructed during those intervals in which the ports 24 are in registration or in line with the line of vision of the tube 6. The lateral walls 25 of the cone are provided adjacent the base 23 with a number of ports 26 symmetrically disposed intermediate the ports 24 of the base 23 and formed on the left hand wall of the casing 13 is a countersunk opening or port 27 in horizontal alignment with the port 26. It will therefore be seen that if a beam of light is directed through the port 27 it will pass through the openings 26, and if the inner face of the base 23 is mirrored as at 28, this beam of light will be reflected as indicated by the arrows along the line of vision of the tube 6, and strike any object or material that may be supported in its path by the stage 9. Although not entirely essential, it has been found desirable to secure a shroud 29 within the casing 13 to prevent any undesired reflection of light. This shroud is provided with a port 31 in line with the port 27, and conforms in general to the contour of the cone 22.

As a convenient source of light I have provided a double walled casing 32 provided with suitable vents 33 for permitting the circulation of air within the casing to dissipate the heat generated. To the outer end of the casing 32 is detachably secured an electric light globe 34, while the inner end of the casing is provided with a suitable light condenser 35. As best shown in Figures 2 and 3 the condenser 35 is adapted to be secured to the casing 13 in line with the opening 27 and to thereby direct a beam of light through the port 27.

The shaft 18 is preferably driven by means of a variable speed electric motor 36, the casing of which may be made to pass over the head 19 of the shaft 18 and its shaft coupled to the shaft 18 by means of the kerf 21.

From the above description it will be noted that the casing 13 and cone 22 form what may for convenience be termed a light valve or shutter for they permit a beam of light to periodically pass through the ports 26 and be reflected down the line of vision to the stage. Intermediate the intervals during which the stage is so illuminated the openings 24 in the base of the cone come into registration with the axis of the body tube thereby permitting an unobstructed view through the microscope to the stage. If therefore, an object having phosphorescent properties is placed in the field of the microscope and subjected to the periodic action of light, as above described it can be observed through the microscope by the phosphorescent light so induced in it. The interval during which induced phosphorescence of this character lasts varies with different materials and therefore some means should be provided for varying the speed of rotation of the cone 22. For this purpose I have resorted to a variable speed motor as above described.

Some elements and materials can be readily distinguished by their phosphorescent properties and therefore it has become possible by the use of my improved microscope and by varying the speed of rotation of the cone 22 to definitely identify certain elements and materials. For example phosphorescence may be induced in uranium nitrate by the action of light and so distinguished from other salts in which phosphorescence cannot be stimulated. Thus I can take an aqueous solution of sulphate of quinine, slightly acidulated, and brush a little of this solution on a piece of parchment, or paper, the area so covered will fluoresce under the action of ultra violet light. Now using the same specimen and taking some finely granulated, or pulverized, uranium nitrate I make a smear of this powder through the field that has already been treated with the sulphate of quinine and then once again observe this area. The uranium nitrate, as well as the sulphate of quinine, will fluoresce, but to the observer it is not apparent where one has been superposed on the other, but if I then take the same specimen, place it on the microscope stage, equipped with an apparatus such as described herein, the uranium will be readily visible with a very definite phosphorescence appearing on an absolutely opaque, or dark, field, which in this case really consists of the coating of the sulphate of quinine, plus the uranium nitrate, but the differentiation is positively and absolutely definitely defined.

By the term "phosphorescence" as here used, is meant the continued emission of light by some substances which have been exposed to light after the stimulus has been removed, as distinguished from fluorescence, which refers to the emission during the stimulus. And a "phosphorescent material" is intended to include a material in which phosphorescence may be stimulated or in which phosphorescent like properties may be induced by the action of light.

The term "light" is intended to include the invisible spectrum as well as the visible. The term "line of vision" as used herein and in the claims is intended to refer to the lines connecting the objective on the stage and the eye-piece.

I claim:

1. In a microscope having a body tube; a hollow frustrated cone open at its smaller base and having spaced ports in its larger base rotatably mounted on said body tube with its axis at an angle to the axis of the tube and with the open portion of its smaller base in alignment with the line of vision through the tube; said spaced ports formed in said larger base arranged to register periodically with said line of vision upon rotation of the cone; a reflecting surface formed on the inner face of the larger base of said cone; spaced openings formed in the lateral walls of said cone intermediate the spaced ports in its base; a source of light mounted adjacent said frustrated cone and means for directing a beam of light from said source to said reflecting surface and downwardly along the line of vision of the tube.

2. An attachment for microscopes comprising a casing having a visual passageway therethrough and a light port adjacent said passageway; a mirror mounted in said casing to rotate in a plane making an acute angle with the line of vision through said passageway; spaced openings in said mirror adapted to periodically register with said line of vision during the rotation of the mirror; means for directing a beam of light through said light port to be reflected by said mirror along said line of vision, and means for intercepting said beam of light during the intervals that the openings in said mirror are in registration with said line of vision.

3. An attachment for microscopes comprising a casing having a visual passageway therethrough and a light port adjacent said passageway; a mirror mounted in said casing to rotate in a plane making an acute angle with the line of vision through said passageway; spaced openings in said mirror adapted to periodically register with said line of vision during the rotation of the mirror; a hollow frustrated cone secured to said mirror and having its open end opposite said mirror in registration with said line of vision; openings in the walls of said cone spaced intermediate the openings in the mirror and means for directing a beam of light through said light port and the openings in the walls of the cone during the rotation of the cone.

4. In a microscope having an eye-piece, a body tube, a stage and an objective, the combination of a casing having a visual passageway therethrough and a light port adjacent said passageway; a mirror mounted in said casing to rotate in a plane making an acute angle with the line of vision through said passageway; spaced openings in said mirror adapted to periodically register with said line of vision during the rotation of the mirror; means for directing a beam of light through said light port to be reflected by said mirror along said line of vision to the stage, and means for intercepting said beam of light during the intervals that the openings in said mirror are in registration with said line of vision.

5. In a microscope adapted to the discovery of phosphorescent properties in opaque matter, having an eye-piece, a stage stationary during periods of observation, and an objective, the combination of a source of light, movable means mounted on the eye-piece side of said stage, comprising a reflector surface mounted to direct said beam of light to said stage, a cooperating opaque surface adapted to cut off the line of vision between said eye-piece and said stage, a light passage opening adapted to uncover said stage to said eye-piece, and a second opaque surface adapted to cut off said source of light, said reflector and said cooperating opaque surface acting simultaneously and said light passage opening and said second opaque surface acting simultaneously upon the alternate functioning of the aforementioned pairs of elements, whereby an opaque object on said stage is subjected to light flowing from said source of light along the cut-off line of vision from said eye-piece, and is then made visible through said eye-piece while the source of light is cut off.

6. In a microscope adapted particularly to the study of the phosphorescent properties of opaque matter, having an eye-piece, a body tube, a stage and an objective, means for periodically bombarding said matter with light and means permitting observation of said matter through said body tube between the periods of light bombardment, means for supporting said matter in a stationary position while said observations are taken, said means for periodically bombarding said matter with light being located between the stage and eye-piece.

7. In a microscope adapted particularly to the study of the phosphorescent properties of opaque matter, having an eye-piece, a body tube, a stage and an objective, means for periodically bombarding said matter with light and means permitting observation of said matter through said body tube between the periods of light bombardment, said means for periodically bombarding said matter with light being located between the stage and eye-piece.

8. In a microscope having an eye-piece, a body tube, a fixed stage and an objective, the combination of a source of light, movably mounted light reflecting and light intercepting means positioned between said eye-piece and said stage for alternately optically aligning said stage first with said source of light and next with said eye-piece, and means for directing said light beam into said movable means, whereby said stage is not visible through said eye-piece at the time said source of light is optically aligned with said stage, but said stage becomes visible the instant said light source is intercepted.

CHARLES F. JONES.